US007954592B2

(12) United States Patent
Miyazaki et al.

(10) Patent No.: US 7,954,592 B2
(45) Date of Patent: Jun. 7, 2011

(54) WORK VEHICLE WITH DRIVE OPERATION DEVICE

(75) Inventors: Eiji Miyazaki, Sakai (JP); Masayuki Nakano, Sakai (JP); Kenzo Ushiro, Sakai (JP); Masataka Takagi, Sakai (JP); Yutaka Inubushi, Sakai (JP)

(73) Assignee: Kubota Corporation, Osaka (JP)

( * ) Notice: Subject to any disclaimer, the term of this patent is extended or adjusted under 35 U.S.C. 154(b) by 346 days.

(21) Appl. No.: 12/062,147

(22) Filed: Apr. 3, 2008

(65) Prior Publication Data

US 2009/0005219 A1    Jan. 1, 2009

(30) Foreign Application Priority Data

Jun. 29, 2007    (JP) ................................. 2007-171877

(51) Int. Cl.
*B60K 20/02*    (2006.01)
(52) U.S. Cl. ........................... 180/321; 180/305; 74/481
(58) Field of Classification Search .................. 180/305, 180/306, 307, 315, 320, 321, 322, 323, 324, 180/326, 330, 333, 331, 335, 336, 337, 364, 180/291, 292; 74/15.63, 481, 560; 477/165
See application file for complete search history.

(56) References Cited

U.S. PATENT DOCUMENTS

| 972,845 | A | * | 10/1910 | Fritohle | 74/483 R |
|---|---|---|---|---|---|
| 1,512,803 | A | * | 10/1924 | Robinson et al. | 180/7.5 |
| 2,232,302 | A | * | 2/1941 | Auten | 192/99 S |
| 2,384,890 | A | * | 9/1945 | Davidson | 180/329 |
| 2,807,935 | A | * | 10/1957 | Lapsley | 60/337 |
| 3,090,473 | A | * | 5/1963 | Askins | 192/3.23 |
| 3,198,276 | A | * | 8/1965 | Gordon | 180/11 |
| 3,223,193 | A | * | 12/1965 | Reynolds et al. | 180/329 |
| 3,316,773 | A | * | 5/1967 | Findlay | 74/481 |
| 3,367,440 | A | * | 2/1968 | Becker | 180/65.22 |
| 3,525,266 | A | * | 8/1970 | Brooks et al. | 74/481 |
| 3,783,962 | A | * | 1/1974 | Shaffer | 180/243 |
| 4,055,047 | A | * | 10/1977 | Hara | 60/444 |
| 4,281,737 | A | * | 8/1981 | Molzahn | 180/307 |
| 4,341,129 | A | * | 7/1982 | Bando | 74/481 |
| 4,346,617 | A | * | 8/1982 | Schroeder et al. | 74/481 |
| 4,369,856 | A | * | 1/1983 | Nudd | 180/321 |
| 4,438,835 | A | * | 3/1984 | Dowden et al. | 477/193 |
| 4,541,497 | A | * | 9/1985 | Riediger et al. | 180/6.48 |
| 4,788,879 | A | * | 12/1988 | Ulrich | 74/481 |
| 4,905,647 | A | * | 3/1990 | Kizer et al. | 123/337 |
| 4,993,509 | A | * | 2/1991 | Howell | 180/333 |
| 4,998,983 | A | * | 3/1991 | Ruprecht et al. | 477/209 |

(Continued)

FOREIGN PATENT DOCUMENTS

JP    2001-032926    2/2001

*Primary Examiner* — Jeffrey J Restifo
*Assistant Examiner* — Brodie Follman
(74) *Attorney, Agent, or Firm* — The Webb Law Firm

(57) ABSTRACT

A work vehicle operable in a rearward facing position using a simple construction is disclosed. The work vehicle includes a hydrostatic stepless change speed device for transmitting power from an engine to a traveling device, a change speed pedal mechanism operable in a forward facing position for changing speeds in the hydrostatic stepless change speed device, and a travel-control lever provided at a rear position of a vehicle body and operable in the rearward facing position. The travel-control lever and the change speed pedal mechanism are linked to each other through a mechanical interlocking mechanism so as to control the hydrostatic stepless change speed device by the travel-control lever through the change speed pedal mechanism.

8 Claims, 9 Drawing Sheets

U.S. PATENT DOCUMENTS

| | | | | |
|---|---|---|---|---|
| 5,052,511 A | * | 10/1991 | Hunt | 180/305 |
| 5,052,512 A | * | 10/1991 | Pakosh et al. | 180/329 |
| 5,127,699 A | * | 7/1992 | Maezawa et al. | 296/65.02 |
| 5,205,181 A | * | 4/1993 | Wright | 74/480 R |
| 5,211,070 A | * | 5/1993 | Hirata et al. | 74/473.21 |
| 5,233,880 A | * | 8/1993 | Sato et al. | 74/473.16 |
| 5,263,385 A | * | 11/1993 | Hirata et al. | 74/481 |
| 5,373,924 A | * | 12/1994 | McKee et al. | 192/3.63 |
| 5,542,312 A | * | 8/1996 | Peters | 74/481 |
| 6,237,711 B1 | * | 5/2001 | Hunt | 180/336 |
| 6,250,414 B1 | | 6/2001 | Sato et al. | |
| 6,279,937 B1 | * | 8/2001 | Hunt | 180/336 |
| 6,347,560 B1 | * | 2/2002 | Maezawa et al. | 74/473.16 |
| 6,390,764 B1 | * | 5/2002 | Merlo et al. | 414/680 |
| 6,679,349 B1 | * | 1/2004 | Pollish, Jr. | 180/326 |
| 6,722,464 B2 | * | 4/2004 | Nakatani et al. | 180/305 |
| 6,931,962 B2 | * | 8/2005 | Maurer et al. | 74/512 |
| 7,210,552 B2 | * | 5/2007 | Priepke | 180/321 |
| 7,243,756 B2 | * | 7/2007 | Muraro | 180/326 |
| 7,458,438 B2 | * | 12/2008 | Nishino et al. | 180/305 |
| 7,562,738 B2 | * | 7/2009 | Suyama et al. | 180/332 |
| 7,721,840 B2 | * | 5/2010 | McCord et al. | 180/336 |
| 2003/0075378 A1 | * | 4/2003 | Sprinkle et al. | 180/321 |
| 2006/0054376 A1 | * | 3/2006 | Shrive et al. | 180/305 |
| 2006/0081084 A1 | * | 4/2006 | Nishino et al. | 74/473.1 |
| 2006/0183582 A1 | | 8/2006 | Blanchard | 474/23 |
| 2007/0240533 A1 | * | 10/2007 | Masumoto et al. | 74/481 |
| 2008/0269015 A1 | * | 10/2008 | Ochiai | 477/209 |

* cited by examiner

WORK VEHICLE WITH DRIVE OPERATION DEVICE

BACKGROUND OF THE INVENTION

1. Field of the Invention

The present invention is directed to a work vehicle comprising a hydrostatic stepless change speed device for transmitting power outputted from an engine to a traveling device; and a change speed pedal mechanism for changing speeds of the hydrostatic stepless change speed device.

2. Description of the Related Art

The above work vehicle is operable to run with an operator's foot, in response to an action of a change speed pedal mechanism for changing speeds of a hydrostatic stepless change speed device.

Such a conventional work vehicle is known in e.g. JP 2001-032926A (see paragraphs 0023 to 0025, and FIGS. 1 and 2).

The work vehicle described in JP 2001-032926A includes driving front wheels and driving rear wheels, each wheel acting as a traveling device. The vehicle further includes a main clutch and the hydrostatic stepless change speed device in a running power transmission system extending from an engine to a running part having the driving front wheel and driving rear wheel. The vehicle still further includes a change speed pedal at foot of an operator area; and a linking mechanism for operatively connecting the change speed pedal and a change speed control shaft of the hydrostatic stepless change speed device.

In the above work vehicle, an implement such as a backhoe is connected to a rear position of a vehicle body, and the operator sometimes controls the implement in a rearward facing position.

In doing so, it is of advantage to effect a desired work, if the operator can move the vehicle to control the implement (e.g. effect a fine positional adjustment of the implement) with retaining his/her rearward facing position, in particular, his/her rearward seated position.

An object of the present invention is to provide a work vehicle which is operable, with a simple construction, to move the vehicle while retaining the rearward facing position.

SUMMARY OF THE INVENTION

For accomplishing the above-noted object, the present invention has the following characterizing feature. Namely:
A work vehicle comprising:
an engine;
a traveling device;
a hydrostatic stepless change speed device for transmitting power from the engine to the traveling device;
a change speed pedal mechanism operable, in a forward facing position, to change speeds of the hydrostatic stepless change speed device;
a travel-control lever provided at a rear position of a vehicle body and operable in a rearward facing position; and
a mechanical interlocking mechanism for linking the travel-control lever and the change speed pedal mechanism so as to allow the travel-control lever to control the hydrostatic stepless change speed device through the change speed pedal mechanism.

With the above construction, the operator can change speeds of the hydrostatic stepless change speed device with the change speed pedal mechanism and move the traveling device in the forward facing position. With the travel-control lever, the operator can control the change speed pedal mechanism in his/her rearward facing position as well, through the mechanical interlocking mechanism. Consequently, the operator can control the hydrostatic stepless change speed device to move the traveling device with retaining his/her rearward facing position.

Since the interlocking mechanism has a mechanical construction, the structure for linking the travel-control lever with the change speed pedal mechanism can be made simple. In doing so, a device for operatively connecting the change speed pedal mechanism to the hydrostatic stepless change speed device can serve also as a portion of a system controlled by the travel-control lever.

Therefore, when an implement is connected at a rear position of the vehicle body, the operator can move the vehicle body even in his/her rearward facing position, to effect a fine positional adjustment of the implement) and other operations with ease and efficiency. Moreover, with a simple and inexpensive construction, it becomes possible to control the hydrostatic stepless change speed device with the travel-control lever.

In one preferred embodiment, the change speed pedal mechanism includes a change speed pedal and a cam mechanism linked to the change speed pedal for urging the change speed pedal to return to a neutral position of the change speed pedal; and the travel-control lever is linked to the cam mechanism through the mechanical interlocking mechanism.

With this, a simple construction makes it possible to place the travel-control lever to its neutral position, when the operator cancels his/her operation to a traveling side (i.e. when the operator cancels his/her forward or rearward traveling operation).

In more particular, when an action on the change speed pedal is cancelled, the pedal returns to its neutral position under the force of the cam mechanism. When the operation to the travel side of the travel-control lever is cancelled, the return urging force produced by the cam mechanism acts on the travel-control lever via the mechanical interlocking mechanism, and the travel-control lever is returned to its neutral position. In course of this, even if a play should occur in a device for linking the cam mechanism with the change speed pedal, the travel-control lever can be returned to the neutral position.

If another device directly linking the travel-control lever with the change speed pedal were employed, the return urging force produced by the cam mechanism would act on the travel-control lever indirectly, i.e. via the change speed pedal. If a play should occur in the change speed pedal, this play could adversely affect the return urging force of the travel-control lever produced by the cam mechanism. In the present invention, on the other hand, since the mechanical interlocking mechanism links the travel-control lever to the cam mechanism, the return urging force produced by the cam mechanism acts on the travel-control lever without involving the change speed pedal. Therefore, even if a play should occur in the change speed pedal, returning the travel-control lever under the force of the cam mechanism can be done so as not to readily invite chattering or the like of the travel-control lever resulting from such a play.

It is accordingly possible to obtain a work vehicle in which the vehicle and implement are operable efficiently with the implement connected to a rear position of the vehicle body, even in the rearward facing position, and that the travel-control lever can be brought to its neutral position with high precision. Moreover, an overall construction can be simplified and thus costs can be reduced from a viewpoint of the travel-control lever operable to move the vehicle, as well as a viewpoint of the cam mechanism of the change speed pedal mechanism acting also as a device for bringing the travel-control lever to its the neutral position.

In one preferred embodiment, a spring is provided to the travel-control lever, the spring urging the travel-control lever to return to a neutral position of the travel-control lever.

With this, the travel-control lever can be returned to its neutral position even when a play should occur in the mechanical interlocking mechanism.

Specifically, such a play in the mechanical interlocking mechanism sometimes results in insufficient return of the travel-control lever mechanism to its neutral position, even if the operator cancels his/her operation of travel-control lever to the travel side and the return urging force of the change speed pedal mechanism acts on the travel-control lever through the mechanical interlocking mechanism. In this case, the spring compensates for the insufficient return of the travel-control lever, to automatically return the travel-control lever to its neutral position.

Thus, regardless of the play in the mechanical interlocking mechanism, the travel-control lever can be automatically returned to the neutral position. And, the work can be done comfortably, without a cumbersome trouble of moving the travel-control lever to its neutral position.

Other features and advantages will become more apparent from the following description with reference to the accompanying drawings.

Unless otherwise specified in the following description, the direction in which the vehicle body travels forward in a straight line (forward advancement) shall be termed the longitudinal direction, the lateral direction that bisects the longitudinal direction at right angles shall be termed the transverse direction (or lateral direction), and the direction perpendicular to the longitudinal direction and the transverse direction shall be termed the vertical direction.

DESCRIPTION OF THE PREFERRED EMBODIMENTS

One preferred embodiment of a work vehicle according to the present invention will be described hereinafter with reference to the accompanying drawings, taking a TLB (a tractor with a front loader and a backhoe) as one example of the work vehicle.

Figure 1:
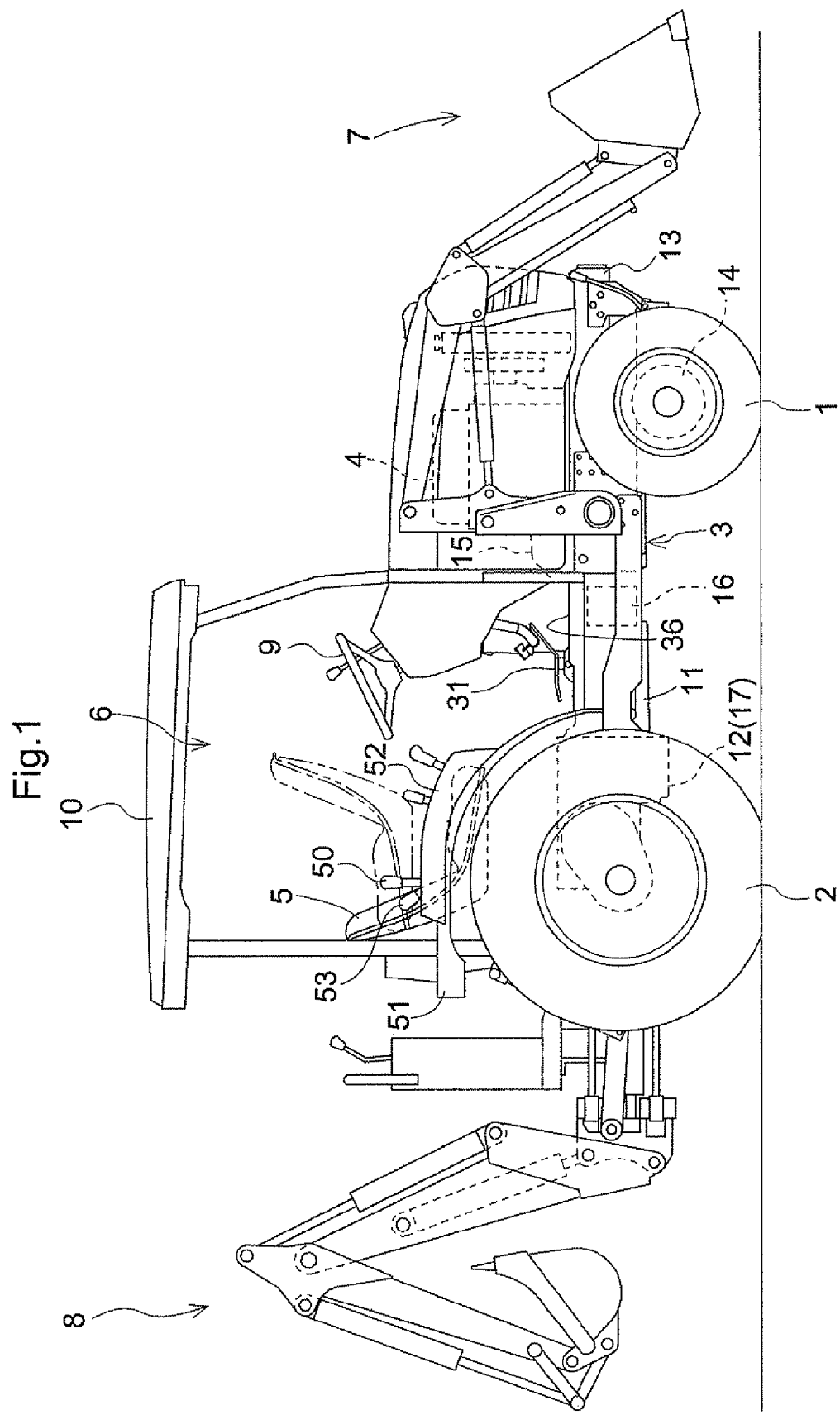
FIG. 1 is an overall side elevation of a work vehicle according to one embodiment of the present invention showing, as one example of such a work vehicle, a TLB (a tractor with a front loader and a backhoe) having civil-construction implements attached to front and rear positions of a vehicle body.

FIG. 1 is an overall side elevation of the work vehicle, which comprises a self-traveling vehicle including a pair of right and left steerable and drivable front wheels 1, 1 and a pair of right and left drivable rear wheels 2, 2, each wheel acting as a traveling device. The vehicle mounts a motor device including an engine 4 provided at a front position of a vehicle body frame 3 and an onboard operator area 6 mounting an operator seat 5 provided to a rear position of the vehicle body frame 3. The vehicle has civil-construction implements connected thereto including a shovel device 7 at a front position of the vehicle body and a backhoe device 8 at a rear position of the vehicle body, to perform a shoveling work and a backhoe work, respectively.

The operator area 6 includes a steering wheel 9 in front of the operator seat 5 and a sun shield 10 besides the operator seat 5.

The vehicle body frame 3 includes the engine 4, a power transmission case 11 attached behind the engine 4, a transmission case 12 attached behind the power transmission case 11, and a front wheel support frame 13 attached to an underside of the engine 4. The front wheel support frame 13 supports the pair of front wheels 1, 1 by means of a front axle case 14. The transmission case 12 supports the rear wheels 2 by means of a rear axle case projecting from opposed lateral walls of the transmission case 12.

Figure 2:
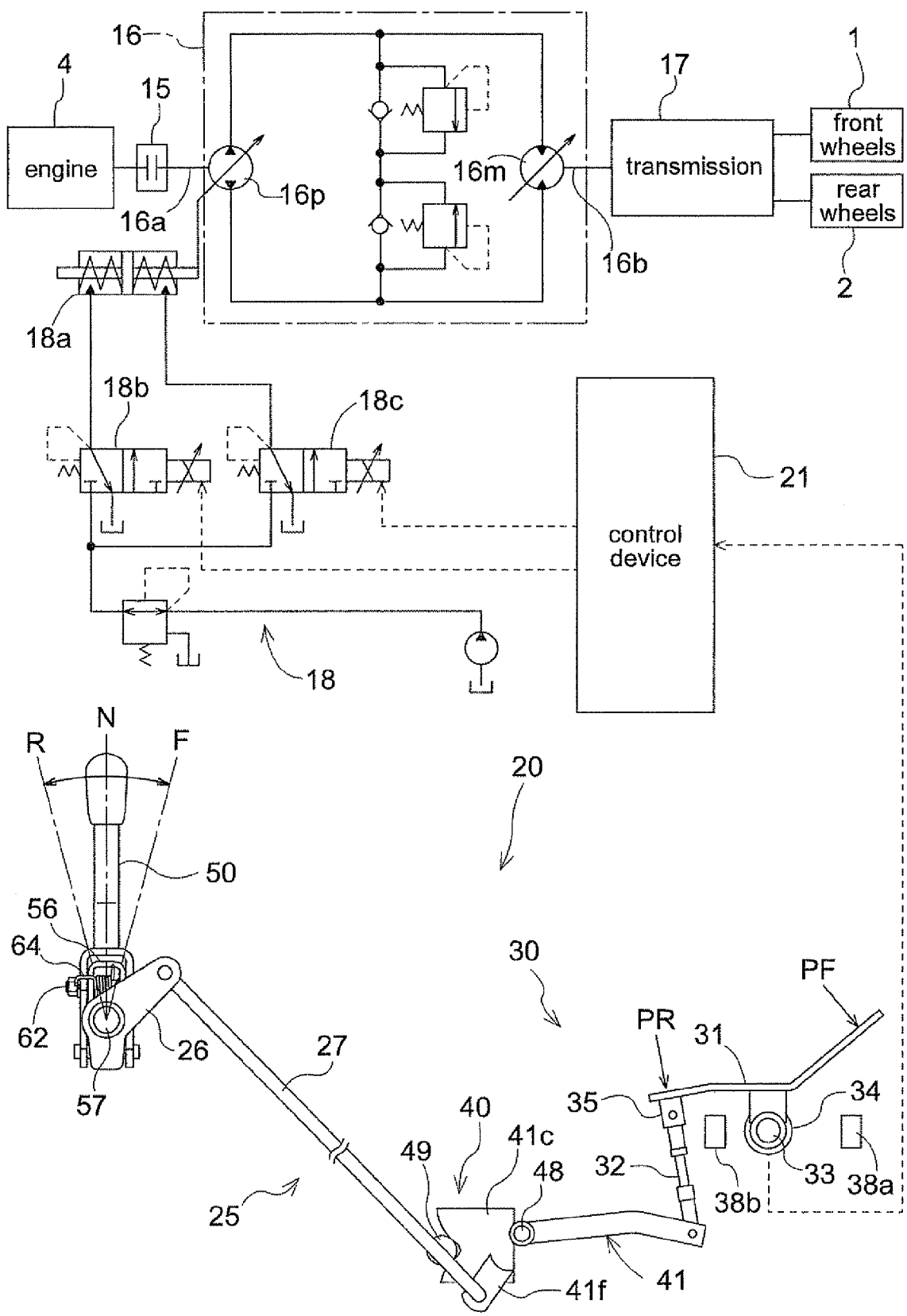
FIG. 2 is a block diagram showing a running power transmission system and a running control device.

FIG. 2 is a block diagram showing a running power transmission system of the vehicle. As shown, the system transmits an output from the engine 4 to an input shaft 16a of a hydrostatic stepless change speed device 16 (hereinafter referred to as a stepless change speed device 16) via a main clutch 15, and divides an output from an output shaft 16b of the stepless change speed device 16 through a running transmission 17 into a front wheel driving power for the front wheels 1 and a rear wheel driving power for the rear wheels 2. The main clutch 15 and the stepless change speed device 16 are housed in the power transmission case 11, while the running transmission 17 is housed in the transmission case 12.

As shown is FIG. 2, the stepless change speed device 16 comprises an axial plunger type variable displacement hydraulic pump 16p having the input shaft 16a acting as a pump shaft, and an axial plunger type hydraulic motor 16m driven by pressurized oil from the hydraulic pump 16p. The hydraulic motor 16m includes the output shaft 16b acting as a motor shaft. The stepless change speed device 16 further comprises a speed change operation device 18 equipped with a servo cylinder type speed change cylinder 18a linked to a swash plate operating shaft of the hydraulic pump 16p. The speed change operation device 18 comprises, in addition to the speed change cylinder 18a, a forward proportional control valve 18b and a rearward proportional control valve 18c, each valve connected to the speed change cylinder 18a. The speed change operation device 18 is installed in the power transmission case 11.

Specifically, the stepless change speed device 16 drives the front wheels 1 and the rear wheels 2 for driving the vehicle forward and rearward in a following manner. The forward proportional control valve 18b and the rearward proportional control valve 18c are operable to change the swash plate angle of the hydraulic pump 16p by the speed change cylinder 18a acting on the forward proportional control valve 18b and the rearward proportional control valve 18c. Thus, the engine power inputted from the main clutch 15 to the pump shaft 16a is convertible to a forward/rearward drive power, and then transmitted from the output shaft 16b to the front wheels 1 and the rear wheels 2 through the running transmission 17 after the stepless speed change regardless of a running direction of the vehicle, i.e. forward or rearward. Further, the stepless change speed device 16 is operable to stop a power supply from the output shaft 16b to quit transmission of power to the front wheel 1 and the rear wheel 2, resulting in a halt of the vehicle.

As shown in the block diagram of FIG. 2, a drive operation device 20 includes: a control device 21 operatively connected to an electromagnetic control device of the forward proportional control valve 18b and rearward proportional control valve 18c of the speed change operation device 18; a change speed pedal mechanism 30 having a change speed pedal 31; and a travel-control lever 50 linked to the change speed pedal mechanism 30 through a mechanical interlocking mechanism 25 (hereinafter referred to as an interlocking mechanism 25).

Figure 3:
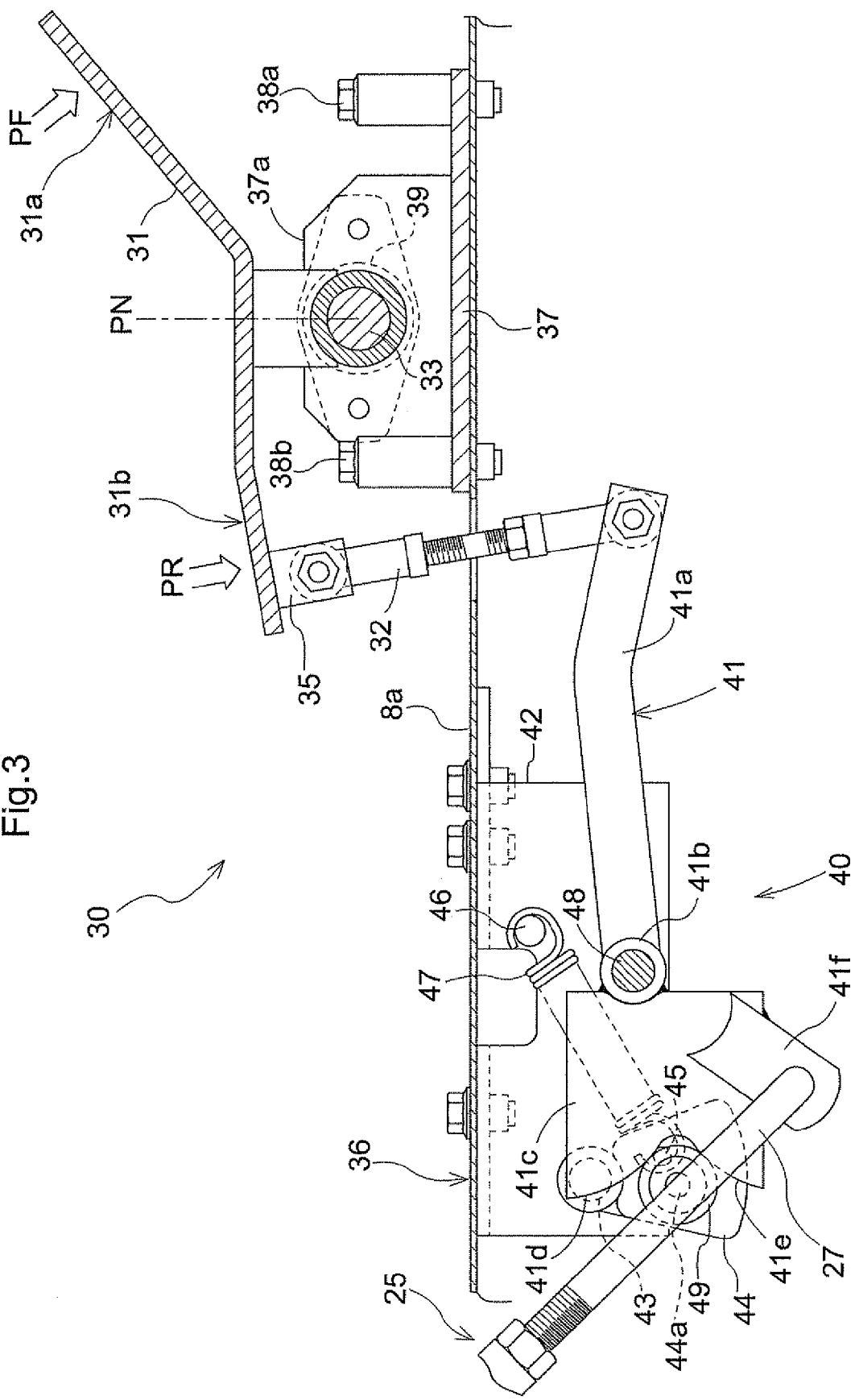
FIG. 3 is a side view of a change speed pedal mechanism.
Figure 4:
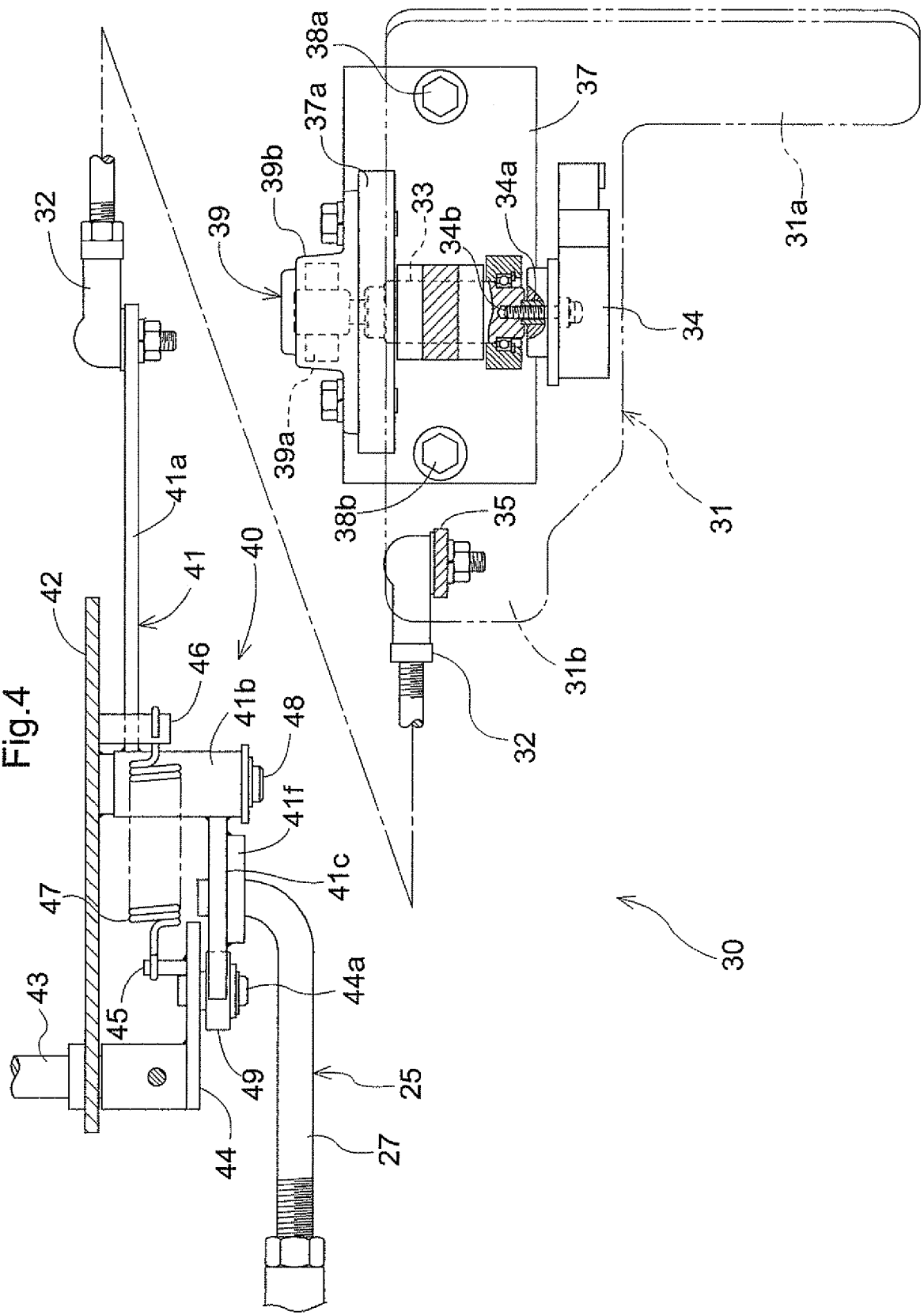
FIG. 4 is a plan view of the change speed pedal mechanism.

FIG. 3 is a side view of the change speed pedal mechanism 30. FIG. 4 is a plan view of the change speed pedal mechanism 30. As shown in these drawings, the change speed pedal mechanism 30 comprises, in addition to the change speed pedal 31, a cam mechanism 40 having a pivot cam 41 linked to a rear end of the change speed pedal 31 through a rod type interlocking member 32, and a rotary potentiometer 34 provided to one end of a pivot shaft 33 of the change speed pedal 31. An end of the interlocking member 32 adjacent the change speed pedal 31 is connected to a connector 35 provided to a reverse surface of a rear end of the change speed pedal 31.

The change speed pedal 31 is provided at a forward position of the operator area 6 so as to be readily operable when the operator seat 5 is switched to a mounting position facing forward (hereinafter referred to as a forward mounting position). The pivot shaft 33 of the change speed pedal 31 is rotatably supported to a stay 37 secured to a floor 36 of the operator area 6. Depressing a forward travel region 31a provided to the front part of the change speed pedal 31, and depressing a rearward travel region 31b positioned on the rear part of the change speed pedal 31 cause the change speed pedal 31 to pivot around a lateral axis of the pivot shaft 33.

The change speed pedal 31 depressed at the forward travel region 31a in a forward direction PF reaches its limit when a reverse surface of the forward travel region 31a comes into contact with an upper end of a forward stopper 38a comprising a bolt which attaches a front end of the stay 37 to the floor 36. The change speed pedal 31 depressed at the rearward travel region 31b in the rearward direction PR reaches its limit when a reverse surface of the rearward travel region 31b comes into contact with an upper end of a rearward stopper 38b comprising a bolt which attaches a rear end of the stay 37 to the floor 36. The change speed pedal 31 further includes a rotary damper 39 provided to a side remote from the rotary potentiometer 34 of the pivot shaft 33. The rotary damper 39 includes a rotor 39a connected to the pivot shaft 33 to be rotatable in unison therewith, and a rotor case 39b supported on a support plate 37a of the stay 37. The rotary damper 39 applies a damping effect on the pivot shaft 33 to prevent vibration of the change speed pedal 31 resulting from its pivoting action.

A rotation control shaft 34a of the rotary potentiometer 34 is connected to the pivot shaft 33 by a connector bolt 34b to be rotatable in unison therewith. The rotary potentiometer 34 detects a rotated position of the pivot shaft 33 to determine an operated position of the change speed pedal 31, converts a result of the detection into an electric signal and outputs it to the control device 21.

The control device 21 is configured by utilizing a microcomputer. The control device 21 operates the forward proportional control valve 18b and the rearward proportional control valve 18c based on the detection data outputted by the rotary potentiometer 34 so as to shift the stepless change speed device 16 correspondingly to the operated position of the change speed pedal 31.

As shown in FIGS. 3 and 4, the cam mechanism 40 includes, in addition to the pivot cam 41, a base member 42 secured to the reverse surface of the floor 36, a positioning element 44 pivotably supported on the base member 42 via a pivot shaft 43, and a positioning spring 47 attached between a support pin 45 provided to the positioning element 44 and a support pin 46 provided to the base member 42.

The pivot cam 41 includes a pivoting arm 41a connected to the interlocking member 32, a connector cylinder 41b having a proximal end of the pivoting arm 41 connected thereto to be rotatable in unison therewith, and a cam plate 41c disposed on a side remote from the pivoting arm 41a across the connector cylinder 41b. The cam plate 41c is connected to the connector cylinder 41b to be rotatable in unison therewith. The pivot cam 41 is supported on the base member 42 by a support shaft 48 rotatably mounting the connector cylinder 41b, to be pivotable around the support shaft 48 in response to an action of the change speed pedal 31.

The positioning element 44 includes a positioning roller 49 which is provided by attaching a ball type bearing, via a support shaft 44a, to a free end of the positioning element 44. The positioning spring 47 urges to pivot the positioning element 44, to abut the positioning roller 49 against a pair of oblique cam surfaces 41d, 41e provided to the cam plate 41c of the pivot cam 41.

Specifically, operating the change speed pedal 31 pivots the pivot cam 41 around the support shaft 48. When the change speed pedal 31 is depressed in the forward direction PF, one oblique cam surface 41e and the positioning roller 49 becomes spaced apart from each other, while the other oblique cam surface 41d and the positioning roller 49 remain contacted with each other under the pivot-urging force of the positioning element 44 produced by the positioning spring 47.

When the change speed pedal 31 is depressed in the rearward direction PR, on the other hand, the other oblique cam surface 41d and the positioning roller 49 becomes separated from each other, while the one oblique cam surface 41e and the positioning roller 49 remain contacted with each other under the pivot-urging force of the positioning element 44 produced by the positioning spring 47.

In these manners, the cam mechanism 40 is operable to pivot and urge the change speed pedal 31 through the interlocking member 32 under the force of the positioning spring 47, and to return the change speed pedal 31 to its neutral position PN automatically.

Figure 5:
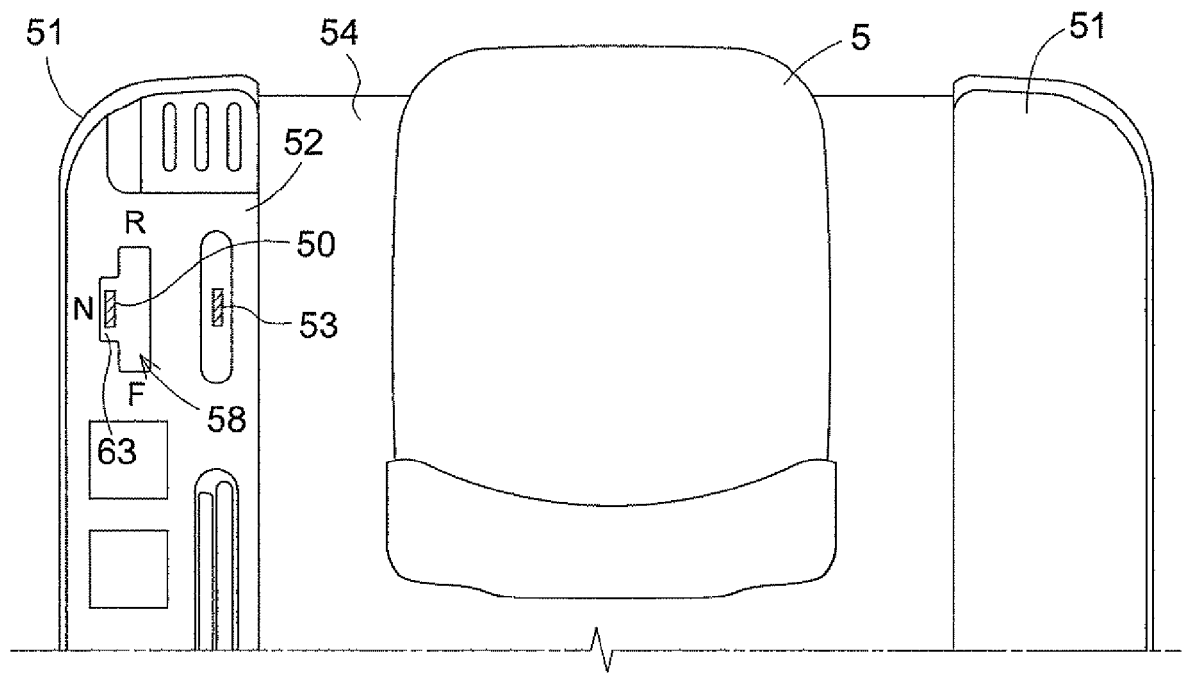
FIG. 5 is a plan view of a region arranging a travel-control lever.

FIG. 5 is a plan view of a region arranging the travel-control lever 50 of the drive operation device 20. As shown, the travel-control lever 50 is disposed on one lateral side of the operator seat 5 at a rearward position of the vehicle body, so as to be readily operable when the operator seat 5 is switched to a mounted position facing rearward (hereinafter referred to as a rearward mounting position). The travel-control lever 50 is vertically inserted through an control panel 52 provided between the operator seat 5 and a rear wheel fender 51. The travel-control lever 50 is arranged laterally side by side with an acceleration lever 53 operable to adjust a rotation of the engine 4.

Figure 6:
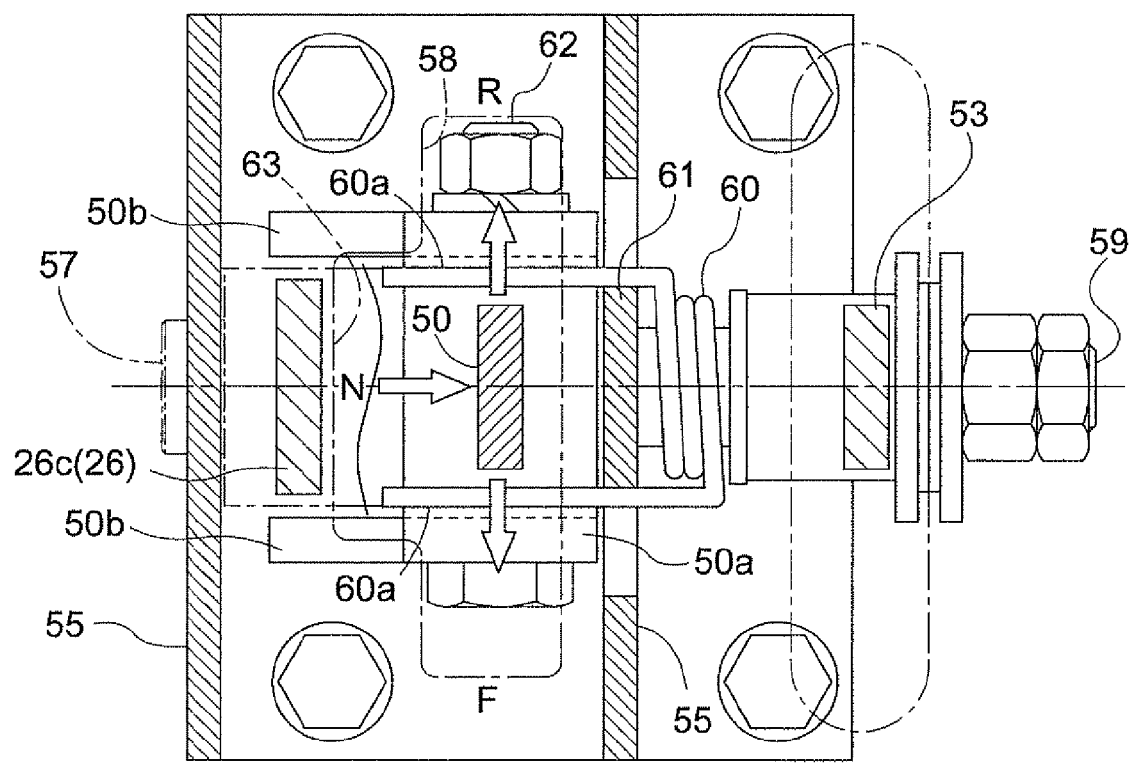
FIG. 6 is a plan view of a travel-control lever support mechanism.
Figure 7:
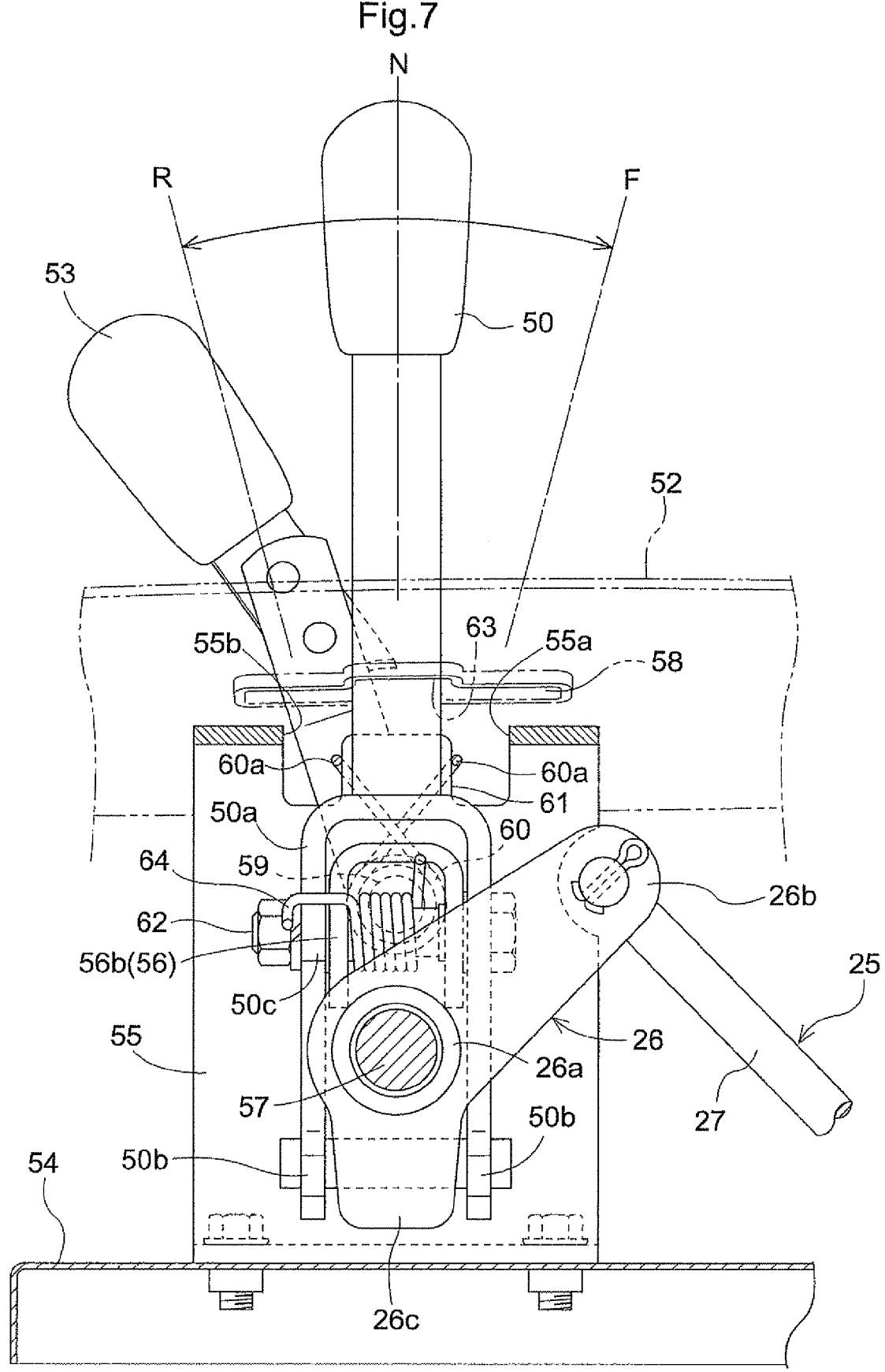
FIG. 7 is a side view of the travel-control lever support mechanism.
Figure 8:
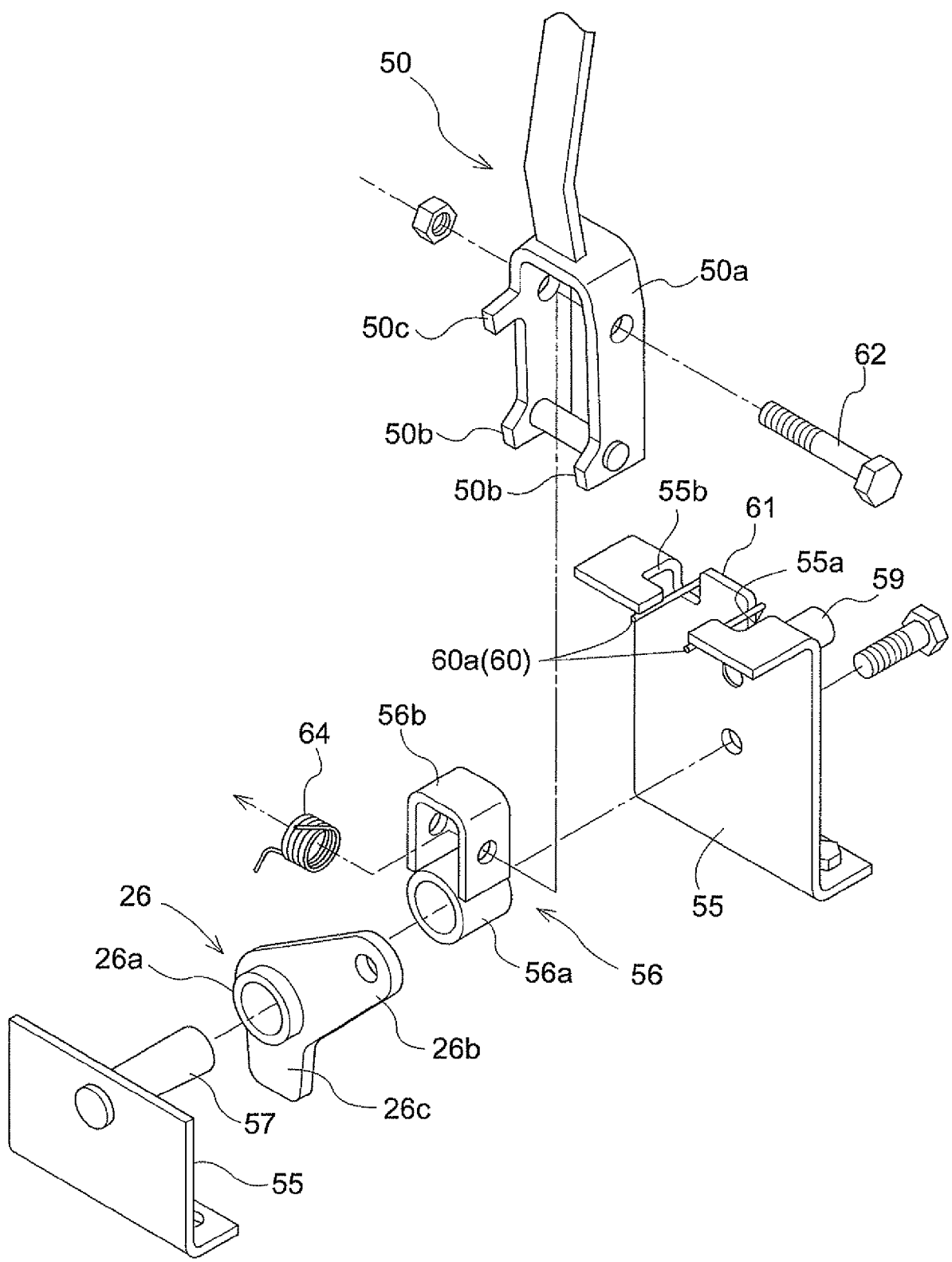
FIG. 8 is an exploded perspective view of the travel-control lever support mechanism.

FIG. 6 is a plan view of a support mechanism of the travel-control lever 50. FIG. 7 is a side view of the support mechanism of the travel-control lever 50. FIG. 8 is an exploded perspective view of the support mechanism of the travel-control lever 50. As shown in these drawings, a prong 50a provided at a proximal end of the travel-control lever 50 is supported by a connector 56 onto a pair of right and left supports 55, 55 secured to a seat support frame 54 below the control panel 52. The connector 56 comprises a connector cylinder 56a and a U-shaped lever support 56b attached to a periphery of the connector cylinder 56a. The connector cylinder 56a and the pair of right and left supports 55, 55 are connected by a support shaft 57 to be rotatable relative to each other. The travel-control lever 50 is pivotable fore and aft along a control guide channel 58 in the control panel 52, around a lateral axis of the support shaft 57. Pivoting the travel-control lever 50 switches it to a neutral position N centrally of the guide channel 58, a forward position F at a front end of the guide channel 58 and a rearward position R at a rear end of the guide channel 58.

A support shaft 59 extends from the support body 55 and mounts a coiled spring 60 thereon whose two ends 60a, 60a are attached to a stem of the travel-control lever 50. The travel-control lever 50 is urged by the spring 60 to automatically return to the neutral position N from both the forward position F and the rearward position R.

Specifically, the two ends 60a, 60a of the spring 60 are separated from each other, one on a spring stopper 61 provided to the support body 55, and the other on the stem of the travel-control lever 50 slightly apart from the prong 50a.

When the travel-control lever 50 is pivoted from the neutral position N to the forward position F, one spring end 60a comes into contact with and support by one end of the spring stopper 61, and the other spring end 60a abuts against the stem of the travel-control lever 50 and is moved by the travel-control lever 50, thereby to deform the spring 60 elastically. The deformed spring 60 applies its elastically restoring force on the travel-control lever 50 via the other spring end 60a thereof.

When the travel-control lever 50 is pivoted from the neutral position N to the rearward position R, on the other hand, the other spring end 60a comes into contact with and supported by the other end of the spring stopper 61, and the one spring end 60a abuts against the stem of the travel-control lever 50 and is moved by the travel-control lever 50, thereby to deform the spring 60 elastically. The elastically deformed spring 60 exerts an elastic restoring force on the travel-control lever 50 now via the one spring end 60a.

In these manners, the spring 60 urges the travel-control lever 50 back to the neutral position N regardless the travel-control lever 50 is operated in the forward position F or the rearward position R. The support shaft 59 further pivotably supports the acceleration lever 53.

As shown in FIGS. 2, 3 and 7, the interlocking mechanism 25 comprises an interlocking link 26 pivotably supported on the support shaft 57 at a connector cylinder 26a, and a round-rod-shaped interlocking bar 27 which connects an output arm 26b of the interlocking link 26 and an input arm 41f provided to the cam plate 41c of the pivot cam 41. The interlocking link 26 and connector 56 are supported on the support shaft 57 to be pivotable relative to the latter.

The lever support 56b of the connector 56 and the prong 50a of the travel-control lever 50 are connected by a connection shaft 62 extending in a different direction from the support shaft 57, to be rotatable relative to each other. The travel-control lever 50 is pivotable in the lateral direction around the connection shaft 62. The travel-control lever 50 thus pivoted is switchable between an interlocked state in which the travel-control lever 50 is positioned along the guide channel 58, and a non-interlocked state in which the travel-control lever 50 is fitted into a notch 63 defined in the control panel 52.

Figure 9:
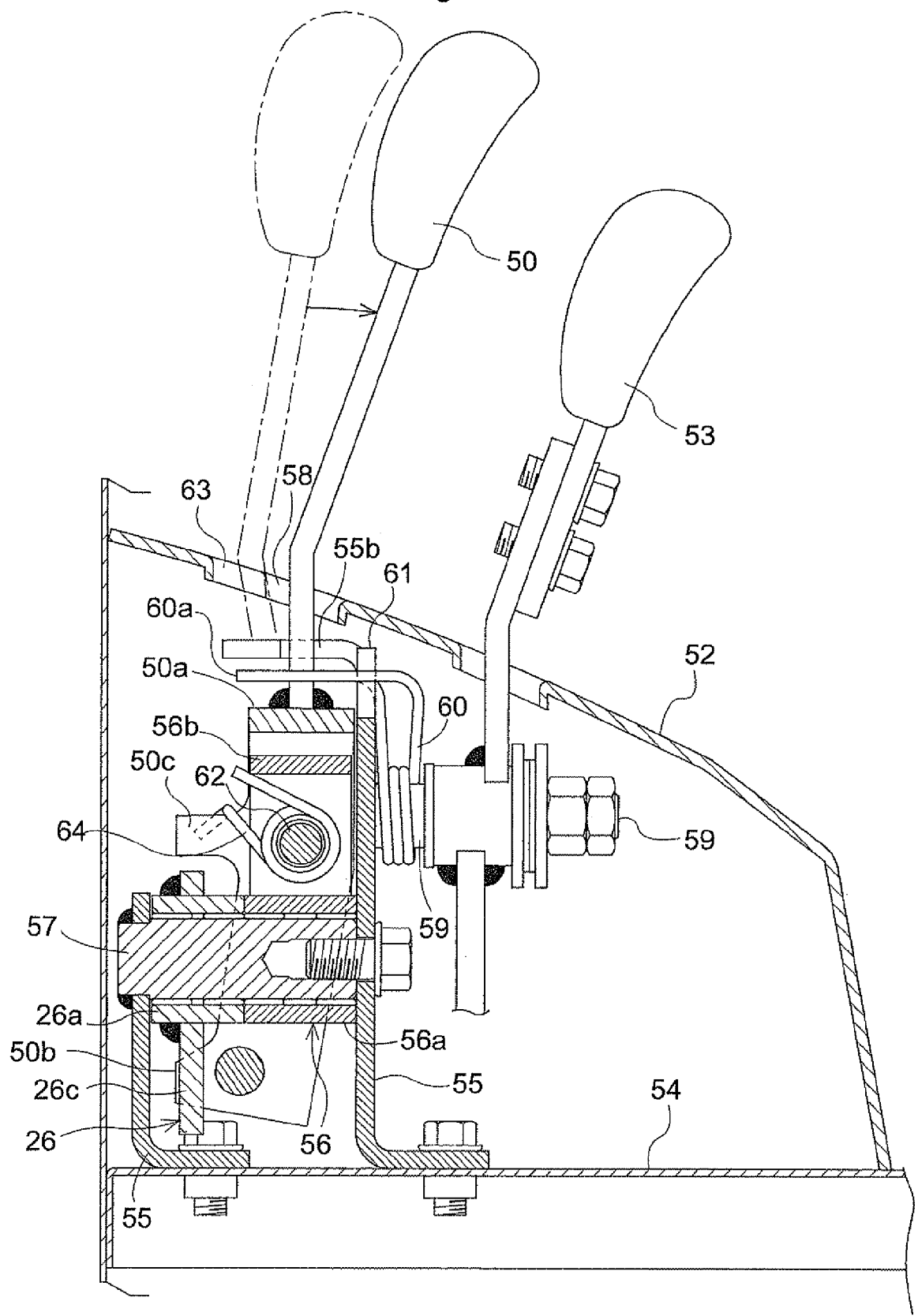
FIG. 9 is a front view of the travel-control lever in an interlocked state with the change speed pedal mechanism.

FIG. 9 is a front view of the travel-control lever 50 in the interlocked state. As shown in this drawing, when the travel-control lever 50 is operated to the interlocked state, a pair of engaging protrusions 50b, 50b on distal ends of the prong 50a of the travel-control lever 50 sandwich a passive piece 26c of the interlocking link 26 so that the prong 50a and the interlocking link 26 engage with each other to be pivotable in unison around the support shaft 57, whereby the travel-control lever 50 and the interlocking link 26 are mutually interlocked and the two pivot in unison. The interlocking mechanism 25 then interlocks the travel-control lever 50 to the pivot cam 41 of the cam mechanism 40, and allows control of the stepless change speed device 16 by the travel-control lever 50 through the change speed pedal mechanism 30.

Specifically, operating the travel-control lever 50 to the forward position F pivots the change speed pedal 31 in the forward PF direction via the interlocking mechanism 25 and cam mechanism 40, and actuates the control device 21 to control the stepless change speed device 16 in the forward change speed state. In doing so, a stem portion of the travel-control lever 50 adjacent prong 50a abuts against a forward-side stopper 55a of the support body 55, whereby the forward stopper 55a determines a forward limit of the stepless change speed device 16 controllable by the travel-control lever 50. The forward stopper 55a sets a forward limit of the travel-control lever 50 lower than that of the change speed pedal 31 determined by the forward stopper 38a, to enable the vehicle to move forward at a low speed (i.e. to creep) close to the neutral position of the stepless change speed device 16.

Operating the travel-control lever 50 to the rearward position R pivots the change speed pedal 31 in the rearward direction PR via the interlocking mechanism 25 and cam mechanism 40, and actuate the control device 21 to control the stepless change speed device 16 in the rearward speed change state. In doing so, the above stem portion of the travel-control lever 50 abuts against a rearward-side stopper 55b of the support body 55, whereby the rearward stopper 55b determines a rearward limit of the stepless change speed device 16 controllable by the travel-control lever 50. The rearward stopper 55b sets a rearward limit of the travel-control lever 50 lower than that of the change speed pedal 31 determined by the rearward stopper 38b, to enable the vehicle to run rearward at a low speed close to the neutral position of the stepless change speed device 16.

Figure 10:
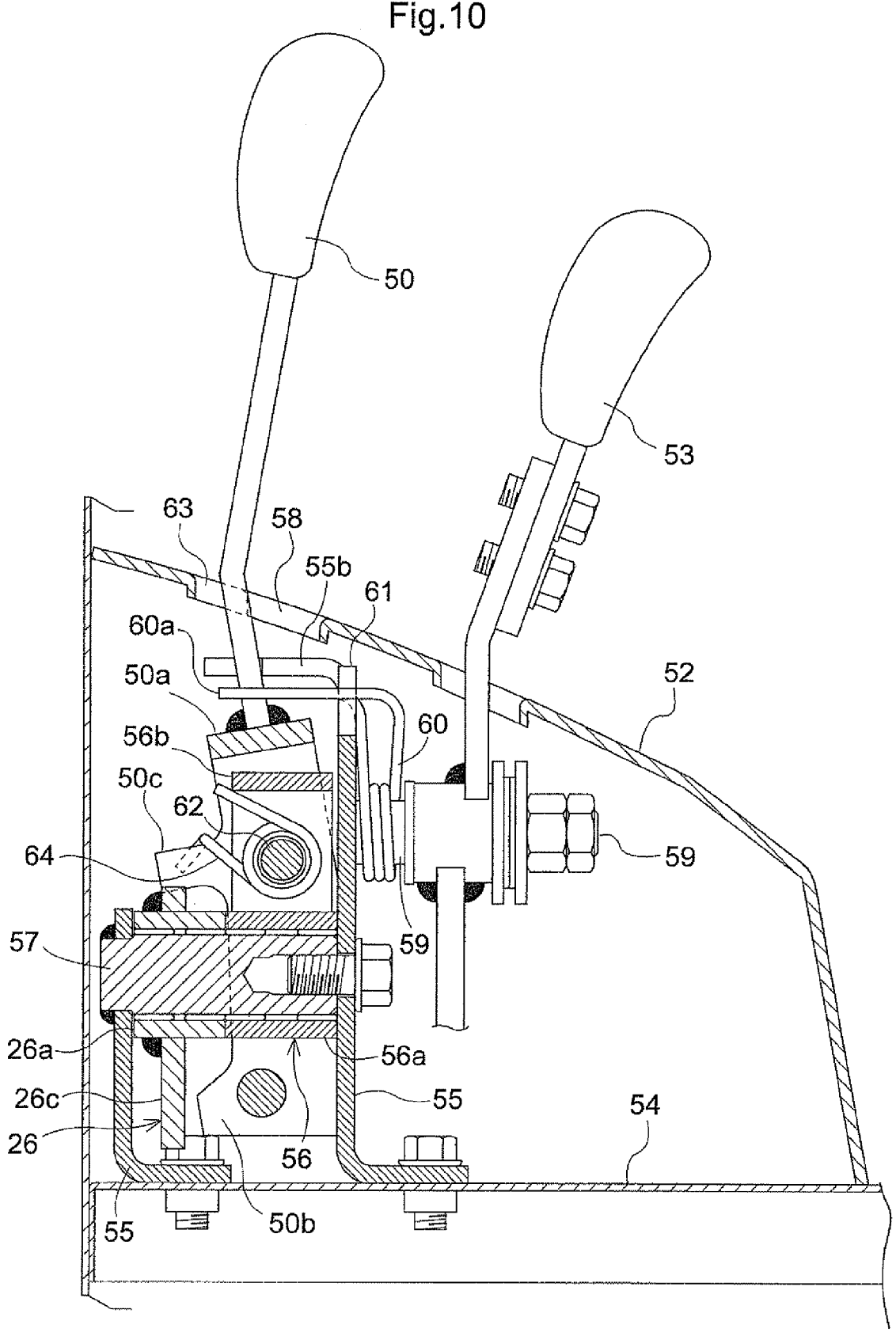
FIG. 10 is a front view of the travel-control lever in a non-interlocked state with the change speed pedal mechanism.

FIG. 10 is a front view of the travel-control lever 50 in the non-interlinked state. As shown in the drawing, when the travel-control lever 50 is operated to the non-interlinked state, the pair of engaging protrusions 50b, 50b on the prong 50a of the travel-control lever 50 are laterally disengaged from the passive piece 26c of the interlocking link 26 so that the prong 50a and the passive piece 26c becomes disengaged to be pivotable relative from/to each other, to cancel the connection between the travel-control lever 50 and the interlocking link 26. The interlocking mechanism 25 then cancels the connection between the travel-control lever 50 and the cam mechanism 40 to disconnect the travel-control lever 50 from the change speed pedal 31, whereby the change speed control of the stepless change speed device 16 by the change speed pedal 31 becomes effective over the entire operational range determined by the forward stopper 38a and the rearward stopper 38b. Specifically, if the travel-control lever 50 and the change speed pedal 31 remain interlocked to each other, when the stepless change speed device 16 is accelerated by the change speed pedal 31, the travel-control lever 50 pivots in association therewith and comes in contact with the forward stopper 55a or rearward stopper 55b to stop the change speed pedal 31 against further acceleration. This stopping action by the travel-control lever 50 on the change speed pedal 31 is not effective in the non-interlinked state.

As shown in FIGS. 7 and 9, the coil-shaped spring 64 supported on the connection shaft 62 has one end thereof hooked to the lever support 56b of the connector 56, and the other end thereof hooked to a spring receiving portion 50c provided to the prong 50a of the travel-control lever 50. The spring 64 is thereby pivotably biased so as to automatically return the travel-control lever 50 to the non-interlocked state.

Specifically, when the work is performed with a shovel device 7, the operator seat 5 is switched to the forward mounting position to control the shovel device 7. In this case, the vehicle is operated using the change speed pedal 31.

That is, the change speed pedal 31 is depressed at the forward travel region 31a or the rearward travel region 31b. The travel-control lever 50 is then moved to the non-interlinked state by the spring 64, and the connection between the travel-control lever 50 and the change speed pedal 31 is canceled. Consequently, the change speed pedal 31 can be depressed to the forward direction PF until the pedal 31 abuts against the forward stopper 38a, and to the rearward direction PR until the pedal 31 abuts against the rearward stopper 38b.

When the change speed pedal 31 is depressed at the forward travel region 31a, the control device 21 switches the forward proportional control valve 18b to a driving state and the rearward proportional control valve 18c to a neutral state based on the data detected by the rotary potentiometer 34, and actuates the speed change cylinder 18a to move the swash plate of the hydraulic pump 16p to the forward side. Consequently, the stepless change speed device 16 is placed in a forward drive speed change state at a speed corresponding to the position of the change speed pedal 31, and drives the front wheel 1 and the rear wheel 2 forward by the running transmission 17, whereby the vehicle travels forward at a rate corresponding to the position of the change speed pedal 31.

When the change speed pedal 31 is depressed at the rearward travel region 31b, on the other hand, the control device 21 switches the forward proportional control valve 18b to a neutral state and the rearward proportional control valve 18c to a driving state based on the data detected by the rotary potentiometer 34, and actuate the speed change cylinder 18a to move the swash plate of the hydraulic pump 16p to the rearward side. Consequently, the stepless change speed device 16 is placed in a rearward drive speed change state at a speed corresponding to the position of the change speed pedal 31, and drives the front wheel 1 and the rear wheel 2 rearward by the running transmission 17, whereby the vehicle travels rearward at a rate corresponding to the position of the change speed pedal 31.

When the work is performed with a backhoe device 8, the operator seat 5 is switched to the rearward mounting position to control the backhoe device 8. In this case, the vehicle is operated using the travel-control lever 50 e.g. when the operator is to adjust a position of the backhoe device 8.

Specifically, the travel-control lever 50 is pivoted laterally inward against the force of the spring 64, from the notch 63 to the guide channel 58. After the travel-control lever 50 enters the interlocked state, the lever 50 can be pivoted forward along the guide channel 58 from the neutral position N to the forward position F, or pivoted rearward along the guide channel 58 from the neutral position N to the rearward position R.

When moved to the forward position F, since the travel-control lever 50 in the interlocked state is liked to the interlocking link 26, the lever 50 controls the stepless change speed device 16 in the forward drive speed change state through the interlocking mechanism 25 and the pedal mechanism 30. Specifically, the travel-control lever 50 pivots the pivot cam 41 by the interlocking mechanism 25, and the pivot cam 41 in turn moves the change speed pedal 31 to the forward direction PF by the interlocking member 32. The control device 21 then switches the forward proportional control valve 18b to the driving state and the rearward proportional control valve 18c to the neutral state based on the data detected by the rotary potentiometer 34, and actuate the speed change cylinder 18a to move the swash plate of the hydraulic pump 16p to the forward side. Consequently, the stepless change speed device 16 is placed in the forward drive speed change state at a speed corresponding with the position of the travel-control lever 50, and drives the front wheel 1 and the rear wheel 2 forward by the running transmission 17, whereby the vehicle travels forward at a low speed.

When moved to the rearward position R, on the other hand, the travel-control lever 50 controls the stepless change speed device 16 in the rearward drive speed change state through the interlocking mechanism 25 and the pedal mechanism 30. Specifically, the travel-control lever 50 pivots the pivot cam 41 by the interlocking mechanism 25, and the pivot cam 41 in turn moves the change speed pedal 31 to the rearward direction PR via the interlocking member 32. The control device 21 then switches the forward proportional control valve 18b to the neutral state and the rearward proportional control valve 18c to the driving state based on the data detected by the rotary potentiometer 34, and actuates the speed change cylinder 18a to move the swash plate of the hydraulic pump 16p to the rearward side. Consequently, the stepless change speed device 16 is placed in a rearward drive speed change state at a speed corresponding to the position of the travel-control lever 50, and drives the front wheel 1 and the rear wheel 2 rearward by the running transmission 17, whereby the vehicle travels rearward at a low speed.

OTHER EMBODIMENT

The foregoing has explained an embodiment of the present invention in details. However, the present invention is not limited to the foregoing embodiment. For instance, a cable device may be used as a mechanical interlocking mechanism to interlock the travel-control lever 50 to the change speed pedal mechanism 30, instead of the foregoing rod type mechanical interlocking mechanism 25 comprising the link 26 and the rod (round-rod-shaped interlocking bar 27).

What is claimed is:
1. A work vehicle comprising:
   an engine;
   a traveling device;
   a hydrostatic stepless change speed device for transmitting power from the engine to the traveling device;
   a change speed pedal mechanism operable, in a forward facing position, to change speeds of the hydrostatic stepless change speed device;
   a travel-control lever provided at a rear position of a vehicle body and operable in a rearward facing position; and
   a mechanical interlocking mechanism for linking the travel-control lever and the change speed pedal mechanism so as to allow the travel-control lever to control the hydrostatic stepless change speed device through the change speed pedal mechanism;
   wherein the change speed pedal mechanism includes a rotatable change speed pedal and a cam mechanism linked to the change speed pedal, the cam mechanism comprising:
       a pivot cam linked to a rear end of the change speed pedal;

a cam plate connected to the pivot cam to be pivotal therewith and having a pair of cam surfaces;

a pivot element supporting a positioning roller abutting the cam surfaces of the cam plate; and a positioning spring to urge the positioning roller in contact with the cam surfaces; and wherein when the change speed pedal is rotated in either direction one cam surface and the positioning roller become spaced apart while the other cam surface and the positioning roller remain in contact with each other under the force of the positioning spring.

2. A work vehicle according to claim 1, wherein the travel-control lever is linked to the cam mechanism through the mechanical interlocking mechanism.

3. A work vehicle according to claim 1, further comprising:

a spring provided to the travel-control lever, the spring urging the travel-control lever to return to a neutral position of the travel-control lever.

4. A work vehicle according to claim 1, wherein the force of the positioning spring causes the change speed pedal to return to a neutral position once released from a rotated position.

5. A work vehicle according to claim 1, wherein the pivot cam comprises a pivot arm having a proximal end connected to the cam plate and a distal end pivotally connected to an interlocking member in turn connected to the rear end of the change speed pedal.

6. A work vehicle according to claim 5, wherein the vehicle body comprises a floor and a base member depends from the underside of the floor, and wherein the proximal end of the pivot arm is connected to the cam plate by a connector cylinder, and the connector cylinder is pivotally supported by a support shaft extending from the base member.

7. A work vehicle according to claim 1, wherein the vehicle body comprises a floor and a base member depends from the underside of the floor, and wherein the positioning spring acts between support pins mounted on the base member and the positioning element, respectively.

8. A work vehicle according to claim 1, wherein the change speed pedal is pivotally supported at an approximate middle of the change speed pedal by a pivot shaft supported by a floor of the vehicle body.

* * * * *